(No Model.)
G. NIMMO.
CRUCIBLE.
No. 271,105. Patented Jan. 23, 1883.
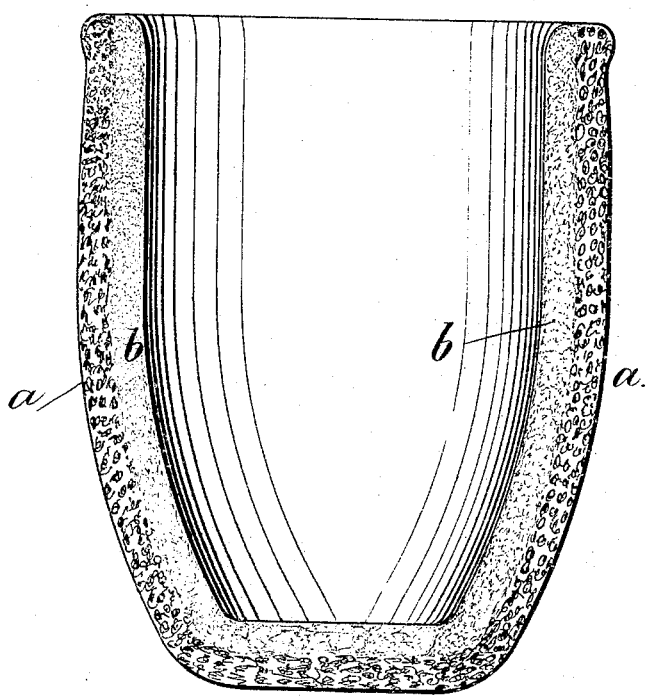
Witnesses
J. Staib
Chas. H. Smith
Inventor
George Nimmo
per Lemuel W. Serrell
atty

UNITED STATES PATENT OFFICE.

GEORGE NIMMO, OF JERSEY CITY, NEW JERSEY.

CRUCIBLE.

SPECIFICATION forming part of Letters Patent No. 271,105, dated January 23, 1883.

Application filed May 29, 1882. (No model.)

*To all whom it may concern:*

Be it known that I, GEORGE NIMMO, of Jersey City, in the county of Hudson and State of New Jersey, have invented an Improvement in Crucibles, of which the following is a specification.

Crucibles have been made of plumbago, and in some instances old pots have been ground up and mixed with fresh plumbago. Pots are exposed to very violent heat on the outside, and the plumbago pots that have not been exposed to fire are more liable to crack and break than pots that are composed partially of old pots. By extensive experiments I have discovered that the interior surfaces of pots that are composed of old pots ground and mixed with clay and plumbago are not as well adapted to the metal as the plumbago pots, because the surface is not so smooth and the metal is liable to adhere.

My present invention has for its object the manufacture of pots that are less expensive than the plumbago pots, and that possess greater durability, and are less liable to crack than the plumbago pots, and that at the same time possess all the advantages of such plumbago pots. The outer surfaces of pots and crucibles become glazed by the intense action of fire, and this portion of old pots is especially available in the manufacture of crucibles. I make use of these outsides or shells of crucibles ground up to the required size and mixed with fire-sand or silica and clay or plumbago. Of this material the outside of the pot is composed, and the inside is made of a lining of plumbago, finely ground, and composed of new plumbago, or containing sufficient new plumbago to produce a smooth and finished inside surface. In the crucibles thus made the exterior is well adapted to withstand fire heat, and the interior is adapted to the melted metal with which it comes into contact. The aforesaid materials are thoroughly mixed together and molded to form the outside, *a*, of the pot shown sectionally in the annexed drawing. This is usually formed up in a mold and thoroughly consolidated. The lining *b* is then applied to the inside of the pot, such lining being of new plumbago, prepared in the usual manner, and spread evenly upon the inside of the pot and thoroughly consolidated. The crucible or pot is hence composed of the plumbago interior surface, and the more refractory and cheap material on the outside; but the two layers are so thoroughly united as to prevent the possibility of separation.

Pots formed in this manner, when dried and baked in the usual manner, possess superior durability, and are not as liable to injury in use as the pots heretofore made.

I am aware that plumbago pots have had a separate protection of asbestus or similar material, and that in some instances one crucible has been placed within the other and secured by a cement. In both these instances the inner and outer materials are separate from each other and do not form one strong complete mass, as in my crucible.

I am also aware that sand and similar pots have been protected on the outside from the fire by a layer of plumbago; but this is the reverse of my pot, and no provision is made for using old crucibles, which actually withstand more heat than new plumbago, and I make use of a material that heretofore has been thrown away, because I can use the outsides of old crucibles, which possess superior refractory powers, and which heretofore were thrown away. I am able to use this material in consequence of lining the crucible with plumbago.

I claim as my invention—

The improved crucible having a lining of plumbago and an exterior of old ground pots and silica or similar material, substantially as set forth.

Signed by me this 24th day of May, A. D. 1882.

GEORGE NIMMO.

Witnesses:
GEO. T. PINCKNEY,
WILLIAM G. MOTT.